United States Patent
Kashimura et al.

(10) Patent No.: US 8,170,286 B2
(45) Date of Patent: May 1, 2012

(54) IMAGE PROCESSING APPARATUS, IMAGE PROCESSING METHOD AND IMAGE PROCESSING SYSTEM

(75) Inventors: Rikiya Kashimura, Hitachinaka (JP); Isao Furusawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1136 days.

(21) Appl. No.: 12/017,917

(22) Filed: Jan. 22, 2008

(65) Prior Publication Data

US 2008/0205705 A1 Aug. 28, 2008

(30) Foreign Application Priority Data

Feb. 27, 2007 (JP) ................................ 2007-046366

(51) Int. Cl.
*G06K 9/00* (2006.01)
(52) U.S. Cl. ...................... 382/104; 382/100; 250/208.1
(58) Field of Classification Search .................. 382/100, 382/104; 250/208.1
See application file for complete search history.

(56) References Cited

U.S. PATENT DOCUMENTS

| | | | |
|---|---|---|---|
| 5,837,994 A | 11/1998 | Stam et al. | |
| 5,990,469 A * | 11/1999 | Bechtel et al. | 250/208.1 |
| 6,255,639 B1 * | 7/2001 | Stam et al. | 250/208.1 |
| 7,972,045 B2 * | 7/2011 | Schofield | 362/466 |
| 7,991,522 B2 * | 8/2011 | Higgins-Luthman | 701/28 |
| 2002/0005472 A1 | 1/2002 | Stam et al. | |
| 2004/0227814 A1 * | 11/2004 | Choi | 348/148 |
| 2006/0177098 A1 * | 8/2006 | Stam | 382/104 |
| 2007/0023613 A1 * | 2/2007 | Schofield et al. | 250/208.1 |

FOREIGN PATENT DOCUMENTS

| | | |
|---|---|---|
| JP | 2004-189229 A | 7/2004 |
| JP | 2005-92857 A | 4/2005 |

* cited by examiner

*Primary Examiner* — Stephen R Koziol
(74) *Attorney, Agent, or Firm* — Crowell & Moring LLP

(57) ABSTRACT

An image processing apparatus includes an input portion for entering an image signal from a camera, an exposure timing determination portion for determining exposure timing of the camera according to an object to be detected, an output portion for outputting a signal to the camera to expose it according to the exposure timing and for outputting a signal to an illumination controller to vary the state of the illumination system installed on a vehicle according to the exposure timing, and an image analysis portion for analyzing the image signal captured by the camera according to the exposure timing and outputting the results of the analysis to another controller via the output portion.

8 Claims, 6 Drawing Sheets

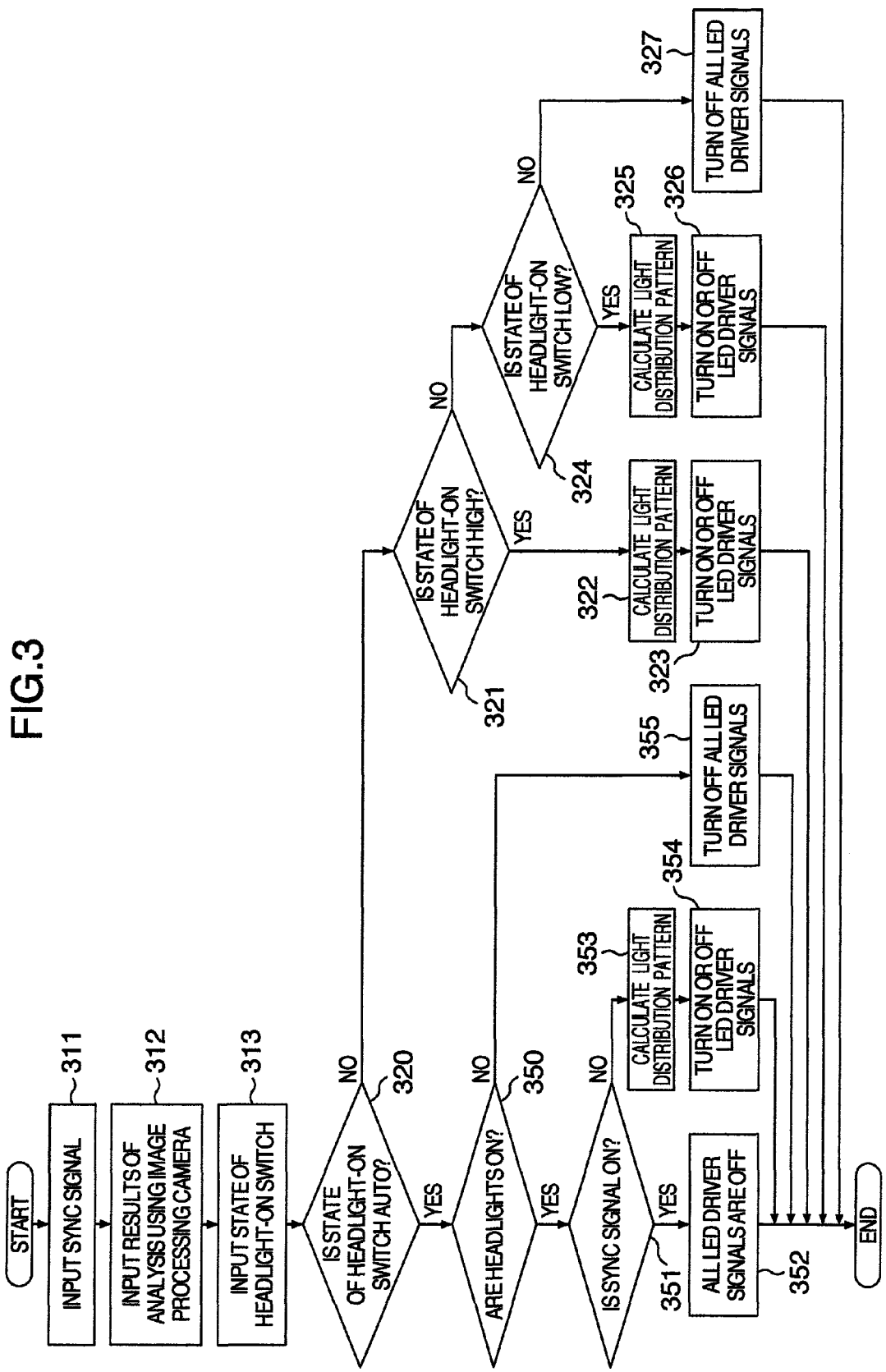

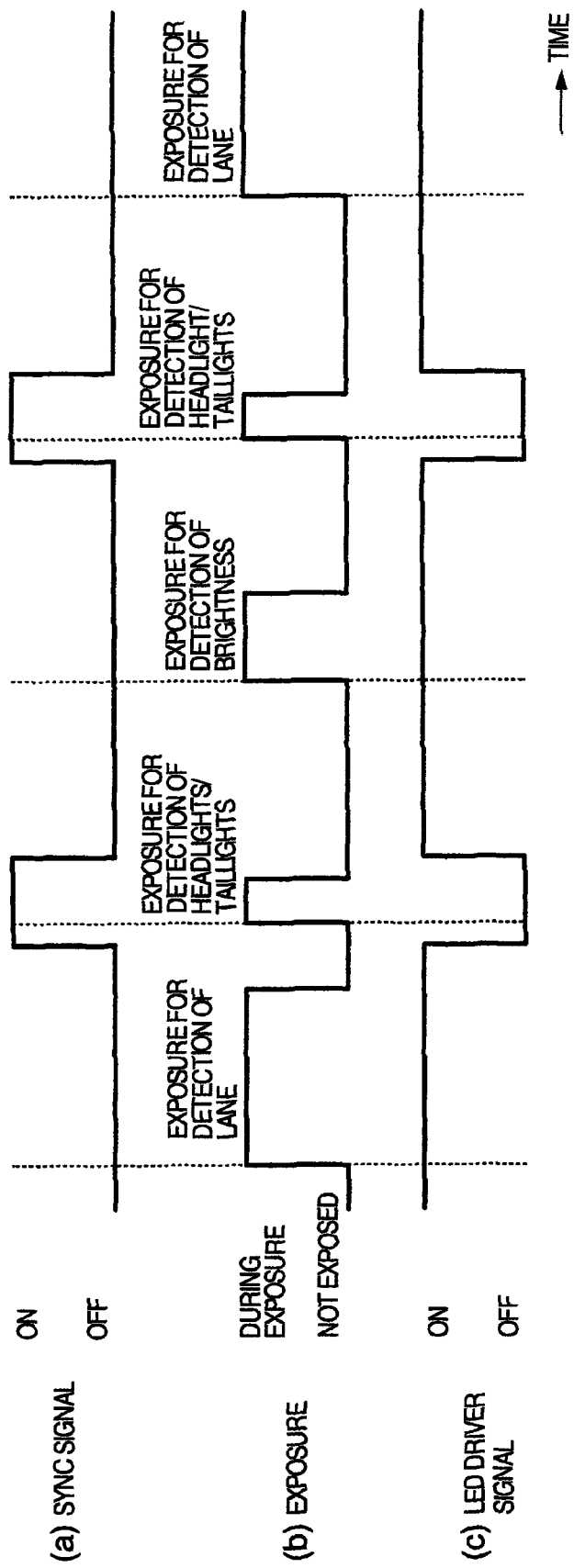

IMAGE PROCESSING APPARATUS, IMAGE PROCESSING METHOD AND IMAGE PROCESSING SYSTEM

BACKGROUND OF THE INVENTION

The present invention relates to an image processing apparatus and to an image processing method. The invention also relates to an image processing system.

A technique for recognizing the positions of other vehicles from images captured by image processing cameras installed in a vehicle is known to offer a safer traffic vehicle (see, for example, JP-A-2004-189229 corresponding to U.S. Pat. No. 5,837,994 etc.).

SUMMARY OF THE INVENTION

However, where other vehicles are detected using light sources such as taillights and headlights of the other vehicles, street lamps and reflectors on the road may cause erroneous detection. The related art has not sufficiently taken account of this problem.

It is an object of the present invention to provide a technique of enhancing the accuracy at which other vehicles are detected by in-vehicle imaging devices.

To achieve the above-described object, the state of the illumination system installed on a vehicle is varied according to the camera's exposure timing.

The present invention permits an in-vehicle imaging device to detect other vehicles with improved accuracy.

Other objects, features and advantages of the invention will become apparent from the following description of the embodiments of the invention taken in conjunction with the accompanying drawings.

BRIEF DESCRIPTION OF THE DRAWINGS

FIG. 3 is a flowchart illustrating one example of processing performed by a headlight controller 110 of FIG. 1.

FIG. 4 is a diagram illustrating one example of timing relationship among exposure made in the embodiment of FIG. 1, a synchronization (SYNC) signal, and a headlight driver signal.

DETAILED DESCRIPTION OF THE EMBODIMENTS

Embodiments are hereinafter described with reference to the drawings.

The present embodiment relates to an image processing system installed on a vehicle and acting to detect the state and positions of light sources present around the vehicle. Where the positions of other vehicles are recognized in nighttime by detecting the tail lamps of a vehicle ahead or the head lamps of an oncoming vehicle and using images captured by image processing cameras installed on the vehicle, the presence of spurious light sources other than the tail lamps and head lamps presents a problem. If the color, brightness value, positional relationship, or other feature of a spurious light source is close to that of the tail lamps or head lamps, it is highly likely that the spurious light source is misrecognized as a vehicle. Even if any misrecognition does not occur, the spurious light source is treated as a candidate for a recognized object during analysis of the captured images and so the amount of wasteful computation increases. This will lead to a decrease in the processing efficiency. That is, when the state and position of a self-emitting object, i.e., a light source, present around the vehicle are detected using image processing cameras, presence of a light source other than the detected object induces misrecognition and deterioration of the processing efficiency, thus posing problems. Especially, these problems are produced when reflecting members such as traffic delineators reflect the light emitted from the present vehicle and thus become reflective light sources.

Accordingly, in the present embodiment, when the surroundings of the vehicle are imaged by image processing cameras in order to detect the positions and status of self-emitting objects, the detection is carried out by temporarily interrupting or reducing the incidence of the illuminating light on the reflective members by controlling the illumination from the present vehicle, extracting regions having brightness values exceeding a given value from images captured during that interval, and analyzing the extracted regions.

Because of the processing on the images captured when the positions and status of self-emitting objects are detected, the reflective light sources such as traffic delineators are eliminated or the brightness values of the reflective light source decrease. Therefore, self-emitting objects to be detected can be detected efficiently and accurately.

Figure 1:
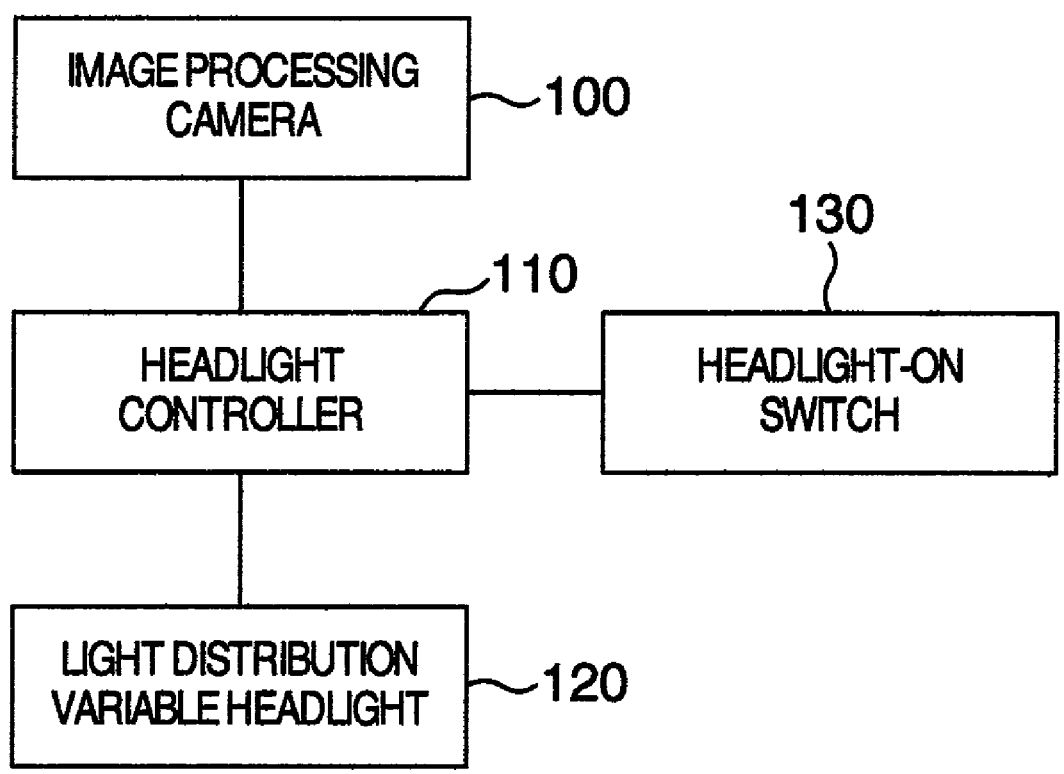
FIG. 1 is a schematic block diagram of a light distribution control system, showing the configuration of the system.

FIG. 1 schematically shows the configuration of a light distribution control system.

An image processing camera 100 is an electronic circuit designed around image sensors and a CPU. The CPU images the circumstances of the surroundings of the vehicle with the image sensors according to an amount of exposure set according to the detected object. The obtained images are analyzed by the CPU according to the detected object. The results of the analysis are output to a headlight controller 110. The camera 100 has a function of outputting a synchronization signal (SYNC signal) to the headlight controller 110 to inform the controller 110 of the exposure timing if necessary. The headlight controller 110 is an electronic circuit designed around a microcomputer and a driver circuit for driving a light distribution variable headlight 120. The controller 110 has a function of controlling ON/OFF of the light distribution variable headlight 120 and light distribution pattern depending on the results of the analysis output from the image processing camera 100 and on the state of a headlight-on switch 130 set by the driver. The light distribution variable headlight 120 is a headlamp including a lens, a reflector, and plural LEDs. The distribution pattern is varied by turning on and off the LEDs in a different pattern. The headlight-on switch 130 is used to detect a headlamp turn-on request determined by the driver. The switch 130 has four states: AUTO, HI, LO, and OFF, for example.

Figure 6:
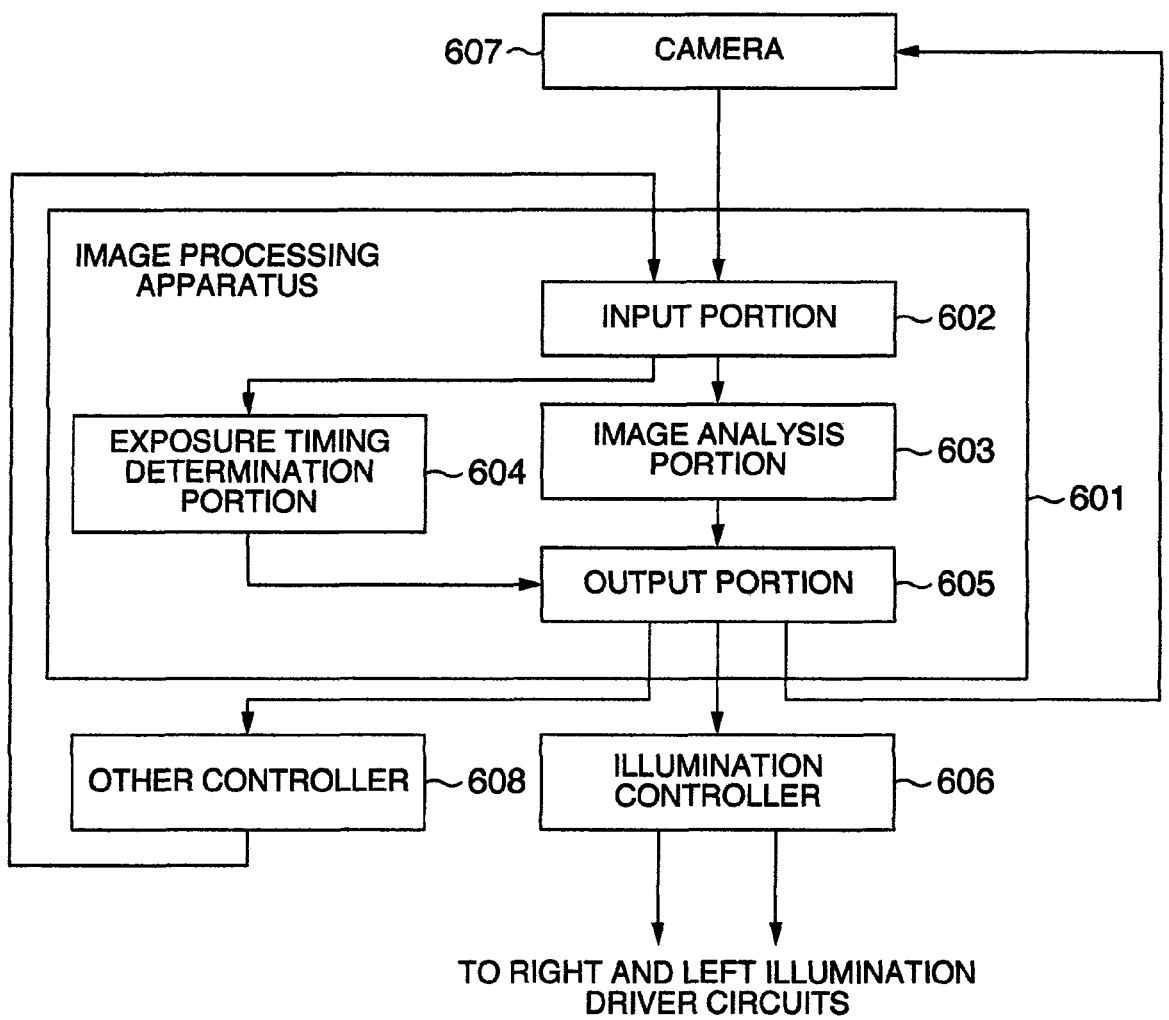
FIG. 6 is a functional block diagram more specifically illustrating the image processing camera 100 of FIG. 1.

FIG. 6 is a functional block diagram more specifically illustrating the image processing camera 100 shown in FIG. 1.

An image processing apparatus 601 forms one unit and includes a CPU and a memory (none of which are shown). The apparatus 601 operates according to a program stored in the memory. An input portion 602 inputs an image signal from a camera 607 that is used to image scenes of the surroundings of the vehicle. Furthermore, the input portion 602 receives control signals from other controller 608 that performs various kinds of control for the operation of the vehicle, for example, to chase the leading vehicle and to avoid collision. An exposure timing determination portion 604 determines the exposure timing of the camera 607 according to the object detected by the camera 607 by processing (described later). An output portion 605 outputs a signal to the camera 607 to expose it according to the exposure timing determined by the exposure timing determination portion 604 according to processing (described later). Also, the output portion 605 outputs a signal to an illumination controller 606 to vary the state of the illumination system installed on the vehicle according to the exposure timing. An image analysis portion 603 analyzes the image signal from the camera that has captured images according to the exposure timing. The analysis portion 603 outputs the results of the analysis to the other controller 608 via the output portion 605.

In this embodiment, the combination of the camera 607 of FIG. 6 and the image processing apparatus 601 corresponds to the image processing camera 100 shown in FIG. 1. However, it does not matter whether or not the camera 607 and image processing apparatus 601 are incorporated in one enclosure. Furthermore, the illumination controller 606 corresponds to the headlight controller of FIG. 1. It does not matter whether the illumination controller 606 is incorporated in the enclosure of the image processing apparatus 601 or present as a separate external apparatus. The same principles apply to the other controller 608.

Light arrangement control operations performed by the image processing camera 100 and headlight controller 110 are next described in detail.

Figure 2:
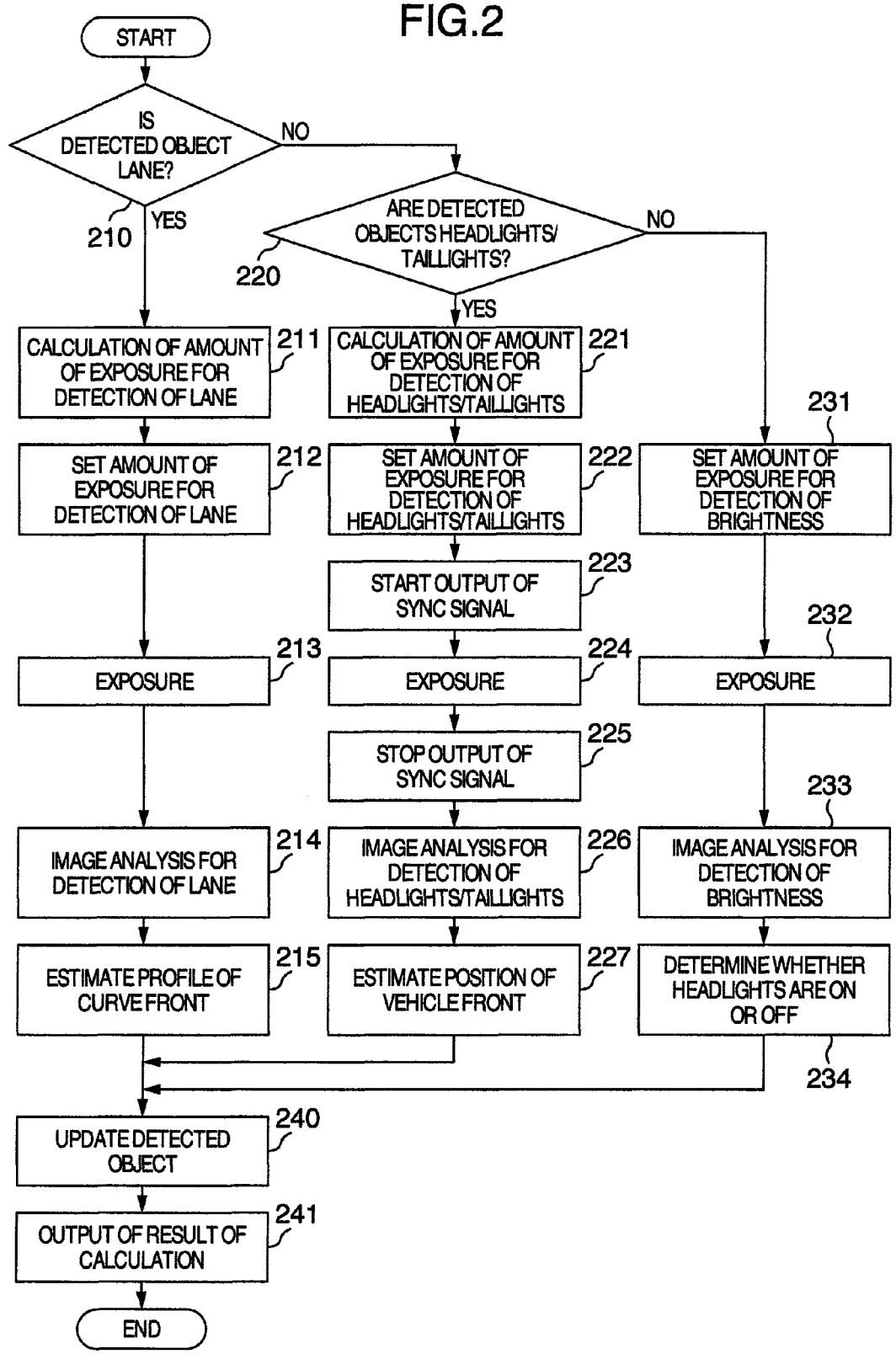
FIG. 2 is a flowchart illustrating one example of processing performed by an image processing camera 100 of FIG. 1.

FIG. 2 illustrates one example of processing performed by the image processing camera 100 of FIG. 1.

First, in steps 210 and 220, objects detected during the present imaging operation are checked. The order in which the objects are detected may be previously determined such that all the objects are detected. The detected object may be switched according to a control signal derived from the other controller 608 of FIG. 6. For example, where the other controller 608 provides control to permit the vehicle to deviate from the present lane, the detected object is set to "lane". Where control is provided to chase the leading vehicle or to avoid collision, the detected object is set to "headlights/taillights". Where the headlights are controlled to turn on and off according to the brightness of the surroundings of the vehicle, the detected object is set to "brightness". For this purpose, the other controller 608 may output a control signal to the image processing apparatus 601.

If the decision at step 210 is YES, i.e., the detected object is a lane, the exposure time is determined such that contrast is produced between the lane and the road surface (step 211). Subsequently, processing for setting is performed such that the object is imaged in the determined exposure time (step 212). After end of the setting of the exposure time, an exposure is made by the image sensors (step 213). The result (i.e., the obtained image) is processed by a method adapted for lane detection such as edge detection (step 214). The profile of the curve located a given distance ahead of the vehicle is estimated from the detected lane information (step 215).

On the other hand, where the decision at step 210 is NO and the decision at step 220 is also NO (i.e., the detected object is brightness), an exposure time preset for brightness decision is set (step 231). After end of the setting of the exposure time, an exposure is made by the image sensors (step 232). The result (i.e., the obtained image) is processed by an analytic method of detecting brightness such as calculation of the average brightness (step 233). A decision is made from the calculated brightness as to whether it is necessary to turn on the headlights (step 234).

If the decision at step 210 is NO and the decision at step 220 is YES (i.e., the detected objects are the headlights/taillights), an exposure time for which detection is made for detection of headlights/taillights is determined (step 221). Then, the processing for setting is performed such that an image is captured in the determined exposure time (step 222). A synchronization (SYNC) signal is then output to inform the headlight controller 110 of start of exposure for detection of headlights/taillights (step 223). After the processing for outputting the synchronization signal is carried out, an exposure is made with the image sensors (step 224). The result (i.e., the obtained image) is processed by an analytic image processing method of detecting headlights/taillights such as concentration projection (step 226). The position of the vehicle located ahead is estimated from the calculated positions and sizes of the headlights and taillights (step 227). Finally, a lane detection subroutine (steps 211-216), a headlights/taillights detection subroutine (steps 221-228), and a brightnesss detection subroutine (steps 231-236) are performed to output the results of these subroutines. For this purpose, whenever each subroutine is carried out, the result of calculation is output (step 241). After termination of each detection operation, the object to be detected the next time is updated (step 240). Control then returns to step 210.

FIG. 3 illustrates one example of processing performed by the headlight controller 110 of FIG. 1.

First, the result of the calculation performed with the synchronization signal and entered from the image processing camera 100 is accepted into the headlight controller 110 by input processing (input subroutine). Also, the state of the headlight-on switch 130 is accepted into the controller 110 by the input subroutine (steps 311-313). Then, the state of the headlight on-switch set by the driver is checked (steps 320, 321, and 324). If the decisions at steps 320, 321, and 324 are all NOs (i.e., the headlight-on switch is OFF), all LED driver signals are turned off to completely turn off the light distribution variable headlight 120 (step 327). If the decision at step 320 is NO, the decision at step 321 is NO, and the decision at step 324 is YES (i.e., the state of the headlight-on switch is LO), a light distribution pattern corresponding to a shooting distance and to the contour of the curve located ahead of the vehicle is calculated (step 325). The shooting distance corresponds to the state (LO) of the headlight-on switch 130. A signal indicating the contour of the curve is entered from the image processing camera 100.

Signals for driving LEDs that need to be lit up to turn on the light distribution variable headlight 120 according to the calculated light distribution pattern are output (step 326). If the decision at step 320 is NO and the decision at step 321 is YES (i.e., the state of the headlight-on switch is HI), a shooting distance corresponding to the state (HI) of the headlight-on switch 130 and a light distribution pattern corresponding to the contour of the curve located ahead and entered from the image processing camera 100 are calculated (step 322). Signals for driving LEDs that need to be lit up to turn on the light distribution headlight 120 according to the calculated light distribution pattern are output (step 323).

If the decision at step 320 is YES (i.e., the state of the headlight-on switch is AUTO), the result of the decision made by the image processing camera 100 regarding lighting of the headlights is checked (step 350). If the decision at step 350 is NO (i.e., it is not necessary to light up the headlights), all the LED driver signals are turned off to completely turn off the light distribution variable headlight 120 (step 355). Meanwhile, if the decision at step 350 is YES (i.e., it is necessary to turn on the headlights), and if the decision at step 351 is NO (i.e., the synchronization signal is not entered from the image processing camera 100), a light arrangement pattern is calculated from information about the position of the vehicle ahead entered from the image processing camera 100 and from the contour of the curve ahead (step 353). Signals for driving LEDs that need to be lit up to turn on the light arrangement variable headlight 120 according to the calculated light distribution pattern are output (step 354). If the decision at step 350 is YES (i.e., it is necessary to turn on the headlight) but the decision at step 351 is YES (i.e., the synchronization signal is entered from the image processing camera 100), images are captured to detect headlights/taillights. Therefore, all the signals for driving the LEDs are turned off to complete turn off the light arrangement variable headlight 120 (step 352). A sequence of operations starting with step 311 is carried out according to conditions. When the sequence of operations is terminated, control is again returned to the processing starting from step 311.

FIG. 4 illustrates the timing relationship among exposure made in the embodiment of FIG. 1, synchronization signal, and headlight driver signals.

In FIG. 4, (a) shows an example of output pattern of the synchronization signal output from the image processing camera 100. (b) shows an example of state in which the image processing camera is exposed. (c) shows an example of typical pattern in which LED driver signals output from the headlight controller 110 are turned on. In the present embodiment, only when exposure for detection of headlights/taillights is made, the headlights are temporarily turned off as mentioned previously. Therefore, the synchronization signal shown in (a) of FIG. 4 is output prior to exposure for detection of headlights/taillights. If the synchronization signal is output, the LED driver signal ((c) of FIG. 4) is turned off. During this interval, the exposure for detection of headlights/taillights is carried out. When this exposure for the detection of headlights/taillights ends, the synchronization signal is stopped from being output. Then, the LED driver signal shown in (c) of FIG. 4 is turned on, turning the headlights on.

In the example shown in FIG. 4, the synchronization signal (a) is output earlier than the start of exposure for detection of headlights/taillights. In some cases, the synchronization signal may be output simultaneously with or after the start of the exposure. Furthermore, in the example shown in FIG. 4, the synchronization signal (a) is stopped from being output after the end of the exposure for detection of headlights/taillights. In some cases, the synchronization signal may be stopped from being output simultaneously with or before end of the exposure. However, in these cases, it follows that the headlights are lit up at some instant of time during the exposure. Therefore, light from the headlights is reflected by reflective members and temporarily entered. Consequently, the result of the imaging process, i.e., the obtained image, contains the reflective light sources. Because the brightness values of the reflective light sources increase in proportion to the time for which the headlights are lit up during exposure, the timing at which the synchronization signal is started to be output and the timing at which the synchronization signal is stopped from being output are determined such that the brightness values of the reflective light sources become smaller than those of the headlights/taillights to permit the headlights/taillights to be detected accurately.

In addition, in the example shown in FIG. 4, the light distribution variable headlight 120 is turned off while the synchronization signal is being output from the image processing camera 100. It is also possible to turn off the light distribution variable headlight 120 only during a given period from the start of outputting of the synchronization signal. This makes it unnecessary for the image processing camera 100 to strictly manage the timing at which the synchronization signal is ceased to be output.

Figure 5A:
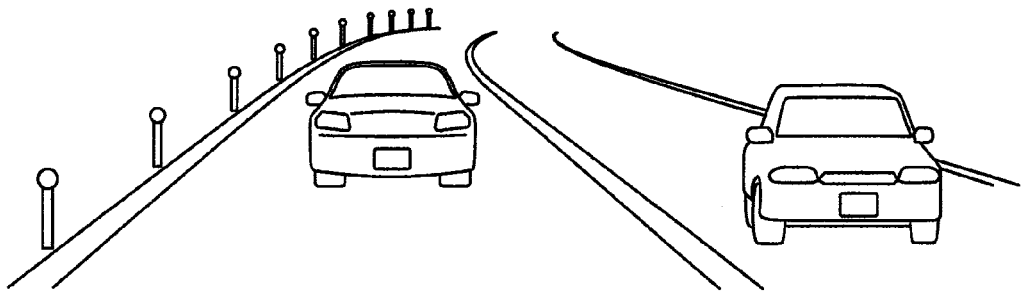
FIGS. 5A-5C show examples of images captured where the processing illustrated in FIGS. 2 and 3 is performed.
Figure 5B:
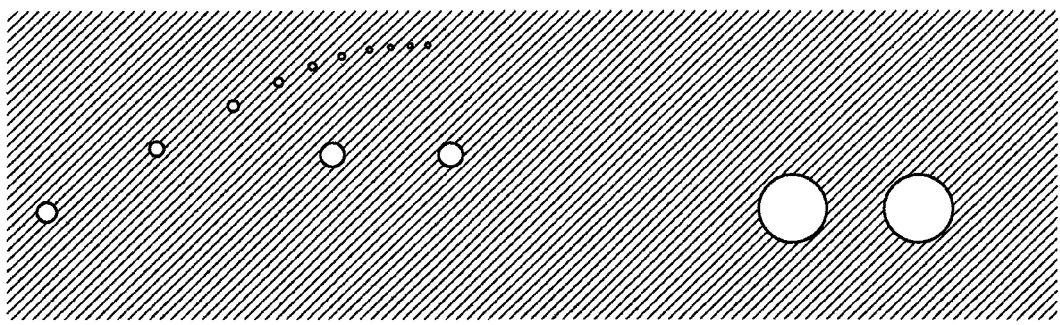
Figure 5C:
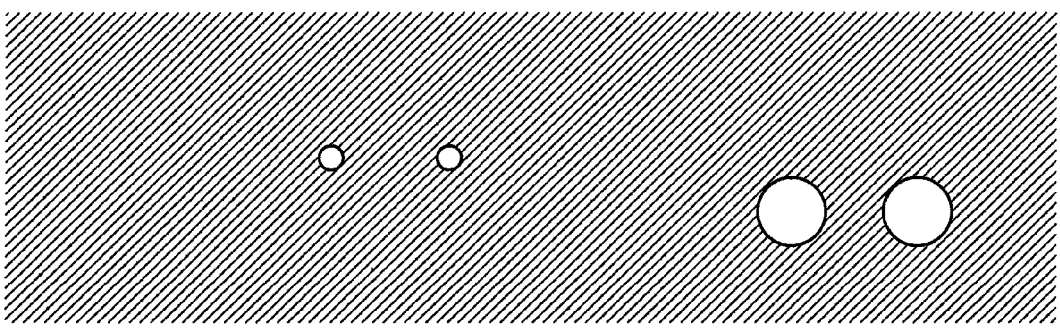

FIGS. 5A-5C show examples of images captured in cases where the processing of FIGS. 2 and 3 is performed. In the figures, the hatched portions are black portions or portions having very low brightness values in the actually obtained images.

FIG. 5A shows an image ahead of a vehicle, taken at nighttime. The vehicle is traveling on a lane. Traffic delineators are installed on the left side of the lane. There are one leading vehicle and one oncoming vehicle on the road. FIG. 5B shows one example of image captured when the image of FIG. 5A was taken under the condition where the headlights of the present vehicle were ON. FIG. 5C shows one example of image captured when the image of FIG. 5A was taken under the condition where the headlights of the present vehicle were OFF. FIGS. 5B and 5C show the results of imaging operations performed under the condition where the exposure time was set to a short time in order to capture images of only light sources. Comparison of FIGS. 5B and 5C shows that where the headlights of the present vehicle were turned off when an image was captured, the traffic delineators were not imaged but only images of the taillights of the leading vehicle and the headlights of the oncoming vehicle were captured.

In the present embodiment, when the detected object is updated in step 240 of FIG. 2, it is not necessary to switch the detected object among all the objects in a given order. In some cases, the order in which the detected object is switched may be varied with time. By varying the order in which the detected object is switched with time, the processing for detecting headlights/taillights is performed at varied intervals. As a result, the light distribution variable headlight 120 can be turned off at varied intervals. Therefore, even if the oncoming vehicle is equipped with the same system as the system of the present embodiment, it is unlikely that the processing operations for detecting headlights/taillights are carried out by the two vehicles at the same timing every time. If the two vehicles should perform their processing operations for detecting headlights/taillights at the same timing every time, exposure would be made while the headlights of the oncoming vehicle were off. Consequently, the oncoming vehicle would not be detected. This can be prevented by varying the intervals at which the headlights are turned off.

Furthermore, in the present embodiment, a headlight fitted with a plurality of LEDs is used as the light distribution variable head light 120. Headlights fitted with xenon lamps or halogen lamps and auxiliary lamps may also be used. In this case, these lamps cannot be turned on and off at high speed, unlike LEDs. Therefore, during exposure for detection of headlights/taillights, these lamps may be simply dimmed without temporarily turning off the lamps. The mere dimming reduces the amount of light incident on reflective members and so the same advantages can be obtained. Additionally, where it is possible to vary the optical axis of each lamp by driving the lens or reflector, the advantage can also be derived if the optical axis is varied during exposure. Moreover, where the positions of reflective members that might become spurious light sources are previously known, the advantage can also be obtained by turning off or dimming some of the lamps or varying the optical axes of some of them to reduce the amount of illumination on the reflective members during exposure.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus comprising:
   an input portion for entering an image signal from a camera that captures images of surroundings of a vehicle;
   an exposure timing determination portion which determines an exposure timing of said camera according to at least one of a plurality of objects to be detected, wherein said at least one of said plurality of objects comprises a lane, a headlight or a taillight of another vehicle, or a brightness of said surroundings;
   an output portion which outputs a signal to said camera to expose said camera according to said exposure timing determined by said exposure timing determination portion and outputs a signal to an illumination controller to vary a state of an illumination system installed on said vehicle according to said exposure timing; and
   an image analysis portion which analyzes an image signal derived from said camera according to said exposure timing and outputs analysis results to another controller via said output portion.

2. The image processing apparatus of claim 1, wherein said output portion outputs said signal to said illumination controller to turn off at least some parts of said illumination system installed on said vehicle according to said exposure timing.

3. The image processing apparatus of claim 1, wherein said output portion outputs said signal to said illumination controller to dim at least some parts of said illumination system installed on said vehicle according to said exposure timing.

4. The image processing apparatus of claim 1, wherein said output portion outputs said signal to said illumination controller to vary optical axes of at least some parts of said illumination system installed on said vehicle according to said exposure timing.

5. The image processing apparatus of claim 1, wherein said output portion outputs said signal to said illumination controller to vary said state of said illumination system installed on said vehicle at an exposure starting timing and to return said illumination system to its original state at an exposure ending timing.

6. The image processing apparatus of claim 1, wherein said exposure timing determination portion varies intervals of time between exposure timings of said camera according to a detected object.

7. The image processing apparatus of claim 1, wherein said image analysis portion analyzes said image signal captured by said camera according to said exposure timing, analyzes said images acquired by said camera while said state of said illumination system is being varied according to said exposure timing output by said output portion, identifies image regions showing brightness values in excess of a given value out of said acquired images, and outputs results of said identification to said other controller via said output portion.

8. An image processing method comprising the steps of:
   determining an exposure timing of a camera that acquires images of surroundings of a vehicle, wherein the exposure timing is determined according to at least one of a plurality of objects to be detected, and said at least one of said plurality of objects comprises a lane, a headlight or a taillight of another vehicle, or a brightness of said surroundings;
   outputting a signal to said camera to expose said camera according to said exposure timing;
   outputting a signal to an illumination controller to vary a state of an illumination system installed on said vehicle according to said exposure timing;
   analyzing an image signal acquired by said camera according to said exposure timing; and
   outputting analysis results to another controller via said output portion.

* * * * *